United States Patent
Beller et al.

(10) Patent No.: US 11,132,358 B2
(45) Date of Patent: Sep. 28, 2021

(54) CANDIDATE NAME GENERATION

(71) Applicant: International Business Machines Corporation, Armonk, NY (US)

(72) Inventors: Charles E. Beller, Baltimore, MD (US); Kristen Maria Summers, Takoma Park, MD (US); Christopher F. Ackermann, Fairfax, VA (US); Michael Drzewucki, Woodbridge, VA (US); Andrew Doyle, Mount Rainier, MD (US)

(73) Assignee: International Business Machines Corporation, Armonk, NY (US)

( * ) Notice: Subject to any disclaimer, the term of this patent is extended or adjusted under 35 U.S.C. 154(b) by 77 days.

(21) Appl. No.: 16/279,650

(22) Filed: Feb. 19, 2019

(65) Prior Publication Data
US 2020/0265042 A1    Aug. 20, 2020

(51) Int. Cl.
*G06F 7/02* (2006.01)
*G06F 16/00* (2019.01)
*G06F 16/242* (2019.01)
*G06F 16/2458* (2019.01)
*G06F 40/295* (2020.01)

(52) U.S. Cl.
CPC ........ *G06F 16/242* (2019.01); *G06F 16/2477* (2019.01); *G06F 40/295* (2020.01)

(58) Field of Classification Search
CPC .... G06F 16/242; G06F 40/279; G06F 40/295; G06F 16/2477; G06F 16/447; G06F 16/9537
See application file for complete search history.

(56) References Cited

U.S. PATENT DOCUMENTS

| | | |
|---|---|---|
| 6,263,364 B1 | 7/2001 | Najork et al. |
| 6,438,543 B1 | 8/2002 | Kazi |
| 6,564,210 B1 | 5/2003 | Korda |
| 6,594,658 B2 | 7/2003 | Woods |
| 8,219,557 B2 | 7/2012 | Grefenstette et al. |
| 8,538,989 B1 | 9/2013 | Datar |
| 8,561,185 B1 | 10/2013 | Muthusrinivasan |

(Continued)

OTHER PUBLICATIONS

"List of IBM Patents or Patent Applications Treated as Related" Mar. 19, 2019, 2 pages.

(Continued)

*Primary Examiner* — Bruce M Moser
(74) *Attorney, Agent, or Firm* — Sonny Z. Zhan

(57) ABSTRACT

A method includes searching an initial set of documents for an initial set of query names. Each query name of the initial set of query names is associated with at least one document of the initial set of documents. The method also includes prioritizing the initial set of query names based on at least one topic label. The method also includes searching an additional set of documents to generate candidate query names. The method also includes prioritizing the candidate query names based on the at least one topic label. The method further includes applying a temporal search filter to each candidate query name to determine whether the candidate query name was processed within a time frame. The method further includes performing disambiguation processing on each candidate query name not processed within the time frame.

16 Claims, 9 Drawing Sheets

(56) References Cited

U.S. PATENT DOCUMENTS

| | | | |
|---|---|---|---|
| 8,890,827 | B1 | 11/2014 | Nordstrom |
| 9,092,989 | B2 | 7/2015 | Agarwal |
| 9,348,915 | B2 | 5/2016 | Iwasa |
| 9,619,457 | B1 | 4/2017 | Gillick |
| 9,679,018 | B1 | 6/2017 | Yuksel |
| 10,268,641 | B1 | 4/2019 | Guha |
| 10,474,708 | B2 | 11/2019 | Roberts |
| 10,599,732 | B2 | 3/2020 | Hassanzadeh |
| 10,621,183 | B1 | 4/2020 | Chatterjee |
| 10,664,660 | B2 | 5/2020 | Li |
| 10,936,819 | B2 | 3/2021 | Beller |
| 2005/0027681 | A1 | 2/2005 | Bernstein |
| 2005/0154761 | A1 | 7/2005 | Lee |
| 2006/0095473 | A1 | 5/2006 | Fox |
| 2007/0022072 | A1 | 1/2007 | Kao |
| 2008/0140616 | A1 | 6/2008 | Encina |
| 2008/0222105 | A1 | 9/2008 | Matheny |
| 2009/0254512 | A1 | 10/2009 | Broder et al. |
| 2011/0035374 | A1 | 2/2011 | Vadrevu |
| 2011/0047161 | A1* | 2/2011 | Myaeng ............ G06F 16/3338 707/740 |
| 2012/0078888 | A1 | 3/2012 | Brown |
| 2012/0089622 | A1 | 4/2012 | Fan |
| 2013/0173639 | A1 | 7/2013 | Chandra |
| 2014/0074826 | A1 | 3/2014 | Cooper et al. |
| 2014/0222792 | A1 | 8/2014 | Groeneveld et al. |
| 2015/0074081 | A1 | 3/2015 | Falter |
| 2015/0154316 | A1 | 6/2015 | Lightner et al. |
| 2015/0186938 | A1 | 7/2015 | Zhang |
| 2015/0370859 | A1 | 12/2015 | Bakir |
| 2016/0012126 | A1 | 1/2016 | Franceschini |
| 2016/0078038 | A1 | 3/2016 | Solanki |
| 2016/0147871 | A1 | 5/2016 | Kalyanpur |
| 2016/0357857 | A1* | 12/2016 | Langmead .......... G06F 16/3344 |
| 2017/0060856 | A1 | 3/2017 | Turtle |
| 2017/0124075 | A1 | 5/2017 | Deng |
| 2017/0161615 | A1 | 6/2017 | Gordon |
| 2017/0228372 | A1 | 8/2017 | Moreno |
| 2017/0277668 | A1 | 9/2017 | Luo |
| 2017/0323019 | A1 | 11/2017 | Hall |
| 2017/0351752 | A1 | 12/2017 | Meehan |
| 2017/0364519 | A1 | 12/2017 | Beller |
| 2017/0364804 | A1 | 12/2017 | Beller |
| 2018/0052817 | A1 | 2/2018 | Bethard |
| 2018/0089307 | A1 | 3/2018 | Cohen |
| 2019/0278777 | A1 | 9/2019 | Malik |
| 2020/0034370 | A1 | 1/2020 | Barron |
| 2020/0183995 | A1 | 6/2020 | Hassanzadeh |
| 2020/0210647 | A1 | 7/2020 | Panuganty |
| 2020/0265042 | A1 | 8/2020 | Beller |
| 2020/0265054 | A1 | 8/2020 | Summers |
| 2020/0265114 | A1 | 8/2020 | Beller |

OTHER PUBLICATIONS

Alam et al., "Structured and Unstructured Document Summarization: Design of a Commercial Summarizer using Lexical Chains", Proceedings of the Seventh International Conference on Document Analysis and Recognition, Jan. 2003, 7 pages.

Benton et al., "Faster (and Better) Entity Linking with Cascades", accessible via the Internal at <http://www.cs.jhu.edu/%7Emdredze/publications/2014_nips_slinky_cascades.pdf>, 6 pages.

Jayaram et al., "Querying Knowledge Graphs by Example Entity Tuples", 2014 IEEE 30th International Conference on Data Engineering, 2014, 16 pages.

No author, "Cluster Analysis", Wikipedia, accessed online from <https://en.wikipedia.org/wiki/Cluster analysis> as of Oct. 1, 2020, 21 pages.

* cited by examiner

CANDIDATE NAME GENERATION

This invention was made with government support under 2018-18010800001 awarded by The United States of America Defense agencies. The government has certain rights to this invention.

BACKGROUND

The present disclosure relates to search queries, and more specifically, to candidate name generation for search queries.

SUMMARY

According to one implementation of the present disclosure, a method includes receiving at least one topic label to be applied to an initial set of documents. The method also includes searching the initial set of documents for an initial set of query names. Each query name of the initial set of query names is associated with at least one document of the initial set of documents. The method also includes prioritizing the initial set of query names based on at least a relevancy to the at least one topic label. The method also includes searching an additional set of documents to generate candidate query names. Each candidate query name is associated with at least one document of the additional set of documents. The method also includes prioritizing the candidate query names based on at least a relevancy to the at least one topic label. The method further includes applying a temporal search filter to each candidate query name to determine whether the candidate query name was processed within a time frame associated with the temporal search filter. The temporal search filter is applied according to the prioritization of the candidate query names. The method further includes performing disambiguation processing on each candidate query name not processed within the time frame.

According to another implementation of the present disclosure, an apparatus includes a memory and a controller coupled to the memory. The controller is configured to receive at least one topic label to be applied to an initial set of documents. The controller is also configured to search the initial set of documents to identify an initial set of query names. Each query name of the initial set of query names is associated with at least one document of the initial set of documents. The controller is further configured to prioritize the initial set of query names based on at least a relevancy to the at least one topic label. The controller is also configured to search an additional set of documents to generate candidate query names. Each candidate query name is associated with at least one document of the additional set of documents. The controller is further configured to prioritize the candidate query names based on at least a relevancy to the at least one topic label. The controller is also configured to apply a temporal search filter to each candidate query name to determine whether the candidate query name was processed within a time frame associated with the temporal search filter. The temporal search filter is applied according to the prioritization of the candidate query names. The controller is further configured to perform disambiguation processing on each candidate query name not processed within the time frame.

According to another implementation of the present disclosure, a computer program product for identifying search entities includes a computer readable storage medium having program instructions embodied therewith. The program instructions are executable by a controller to cause the controller to receive, by the controller, at least one topic label to be applied to an initial set of documents. The program instructions are also executable to cause the controller to search, by the controller, the initial set of documents to identify an initial set of query names. Each query name of the initial set of query names is associated with at least one document of the initial set of documents. The program instructions are also executable to cause the controller to prioritize, by the controller, the initial set of query names based on at least a relevancy to the at least one topic label. The program instructions are also executable to cause the controller to search, by the controller, an additional set of documents to generate candidate query names. Each candidate query name is associated with at least one document of the additional set of documents. The program instructions are also executable to cause the controller to prioritize, by the controller, the candidate query names based on at least a relevancy to the at least one topic label. The program instructions are also executable to cause the controller to apply, by the controller, a temporal search filter to each candidate query name to determine whether the candidate query name was processed within a time frame associated with the temporal search filter. The temporal search filter is applied according to the prioritization of the candidate query names. The program instructions are also executable to cause the controller to perform, by the controller, disambiguation processing on each candidate query name not processed within the time frame.

DETAILED DESCRIPTION

Figure 1:
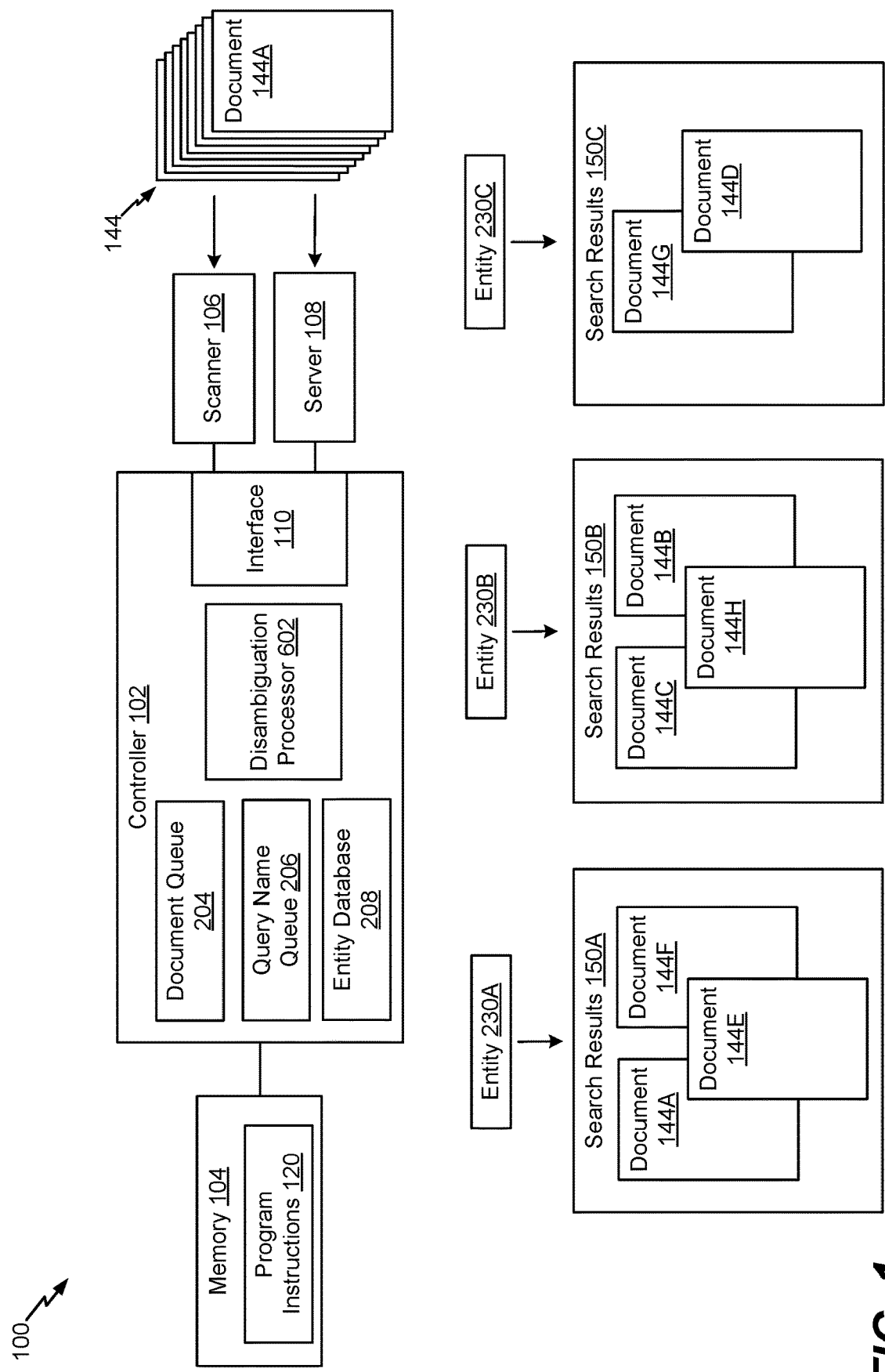
FIG. 1 is a diagram of a system that is operable to sort documents into different clusters based on entity names associated with the documents.

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein (e.g., when no particular one of the features is being referenced), the reference number is used without a distinguishing letter. However, when one particular feature of multiple features of the same type is referred to herein, the reference number is used with the distinguishing letter. For example, referring to FIG. 1, multiple documents are illustrated and associated with reference numbers 144A, 144B, etc. When referring to a particular one of these documents, such as the document 144A, the distinguishing letter "A" is used. However, when referring to any arbitrary one of these documents 144 or to these documents as a group, the reference number 144 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to a grouping of one or more elements, and the term "plurality" refers to multiple elements.

As used herein, "generating", "calculating", "using", "selecting", "accessing", and "determining" are interchangeable unless context indicates otherwise. For example, "generating", "calculating", or "determining" a parameter (or a signal) can refer to actively generating, calculating, or determining the parameter (or the signal) or can refer to using, selecting, or accessing the parameter (or signal) that is already generated, such as by another component or device. As used herein, "coupled" can include "communicatively coupled," "electrically coupled," or "physically coupled," and can also (or alternatively) include any combinations thereof. Two devices (or components) can be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled can be included in the same device or in different devices and can be connected via electronics, one or more connectors, or inductive coupling, as illustrative, non-limiting examples. In some implementations, two devices (or components) that are communicatively coupled, such as in electrical communication, can send and receive electrical signals (digital signals or analog signals) directly or indirectly, such as via one or more wires, buses, networks, etc. As used herein, "directly coupled" is used to describe two devices that are coupled (e.g., communicatively coupled, electrically coupled, or physically coupled) without intervening components.

Cognitive systems can search unstructured documents for information about real-world entities and can identify documents that refer to a particular entity. For example, a cognitive system can identify a document that refers to a first entity (e.g., "John Doe" the musician) and can identify a document that refers to a second entity (e.g., "John Doe" the lawyer). The traditional mode of using the cognitive system is by the user entering the name of an individual. The cognitive system searches a plurality of documents for mentions of individuals that match the query and performs entity disambiguation by clustering the documents into an estimate of different identities reflected in the documents. For example, a first cluster can include a plurality of documents related to "John Doe" the musician, and a second cluster can include a plurality of documents related to "John Doe" the lawyer. The cognitive system checks each cluster to determine whether the cluster matches a pre-defined set of topics (e.g., music) and labels the entity clusters accordingly.

Querying for specific individuals helps the user to identify known entities that are reflected in the documents. The labels highlight the known entities that are relevant to the user's analytic focus. However, there may be information about many other individuals that the user is not aware of and who are not specifically associated with known individuals. As new documents are ingested, there is a need to provide situational awareness to the user by surfacing potentially relevant individuals without requiring the user to query for them.

FIG. 1 is a diagram of a system 100 that is operable to sort documents into different clusters based on entity names associated with the documents. The system 100 includes a controller 102, a memory 104 coupled to the controller 102, a scanner 106 coupled to the controller 102, and a server 108 coupled to the controller 102. The memory 104 is a non-transitory computer readable storage medium that includes program instructions 120. The program instructions 120 are executable by the controller 102 to perform the operations described below. The controller 102 includes an interface 110, a document queue 204, a query name queue 206, an entity database 208, and a disambiguation processor 602. Operations associated with the document queue 204, the query name queue 206, the entity database 208, and the disambiguation processor 602 are described with respect to FIGS. 2-7. The controller 102 can also include additional components that are not shown in FIG. 1.

The scanner 106 is configured to scan an initial set of documents 144 and provide the initial set of documents 144 to the controller 102 via the interface 110. In the illustrative example of FIG. 1, the initial set of documents 144 includes eight documents 144A-144H. However, in other implementations, the initial set of documents 144 can include additional (or fewer) documents. As a non-limiting example, the initial set of documents 144 can include over one million documents. The initial set of documents 144, or a subset of the initial set of documents 144, can also be accessed via the server 108. For example, the server 108 can provide the initial set of documents 144, or a subset of the initial set of documents 144, to the controller 102 via the interface 110.

The controller 102 is configured to sort the initial set of documents 144 by entities 230 that are associated with the documents 144. To illustrate, a document 144A, a document 144E, and a document 144F are associated with an entity 230A. The documents 144A, 144E, 144F are bundled such that when a user searches for the entity 230A, search results 150A for the entity 230A can include the documents 144A, 144E, 144F. As a non-limiting example, the entity 230A can refer to a musician named "John Doe." If the user enters the search query "John Doe musician", the controller 102 can produce the documents 144A, 144E, 144F (or generate links to the documents 144A, 144E, 144F). A document 144B, a document 144C, and a document 144H are associated with an entity 230B. The documents 144B, 144C, 144H are bundled such that when a user searches for the entity 230B, search results 150B for the entity 230B can include the documents 144B, 144C, 144H. As a non-limiting example, the entity 230B can refer to a lawyer named "John Doe." If the user enters the search query "John Doe lawyer", the controller 102 can produce the documents 144B, 144C, 144H (or generate links to the documents 144B, 144C, 144H). A document 144D and a document 144G are associated with an entity 230C. The documents 144D, 144G are bundled such that when a user searches for the entity 230C, search results 150C for the entity 230C can include the documents 144D, 144G. As a non-limiting example, the entity 230C can refer to a tennis player named "John Doe." If the user enters the search query "John Doe tennis", the controller 102 can produce the documents 144D, 144G (or generate links to the documents 144D, 144G).

Figure 2:
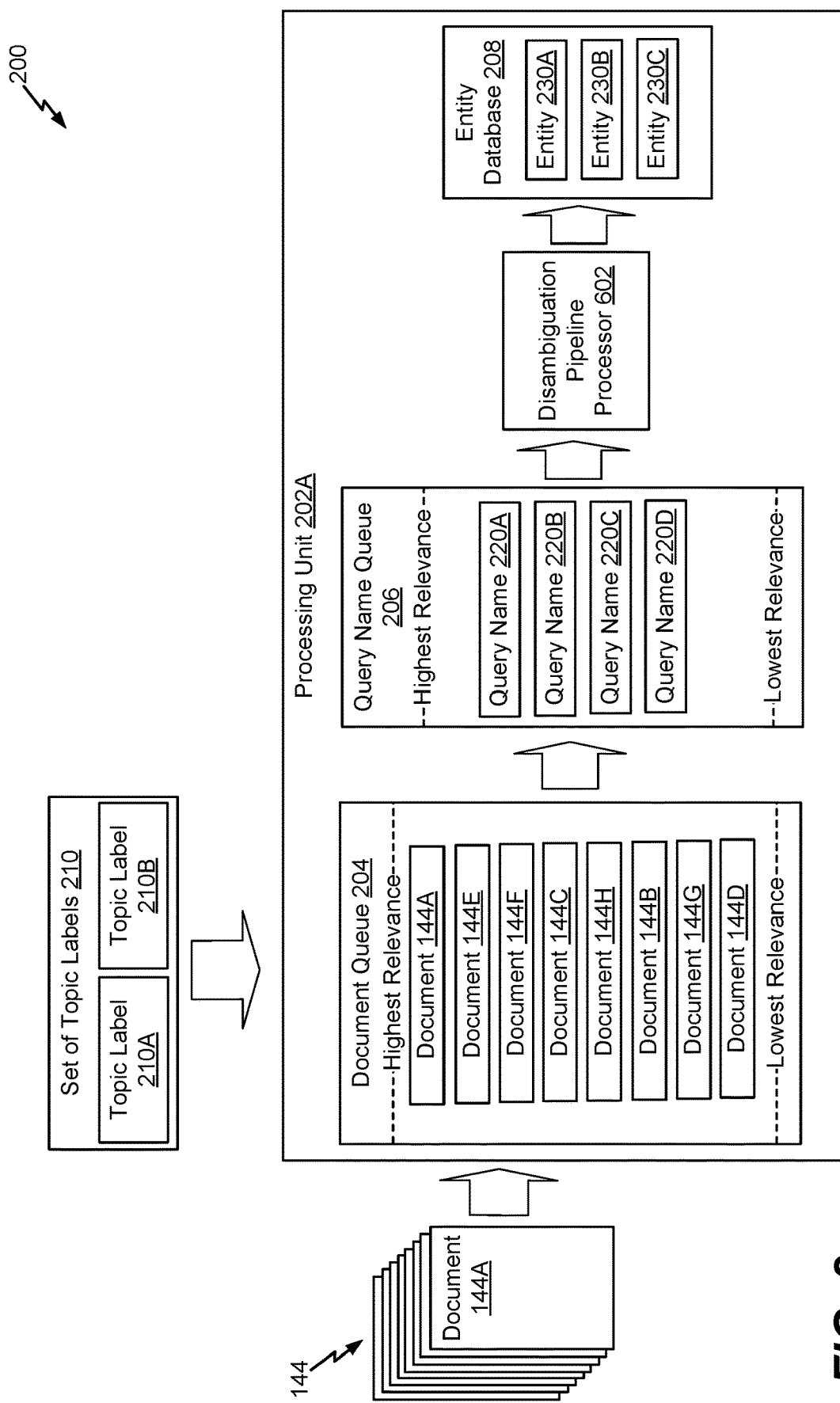
FIG. 2 is a diagram of a system that is operable to prioritize an initial set of documents based on user-defined labels and identify different entities from the prioritized documents.

As described with respect to FIG. 2, the controller 102 processes the initial set of documents 144 based on user-defined labels such that the documents 144 of interest to the user are processed before the documents 144 that are not of interest (or of little interest) to the user. As a non-limiting example, if the user-defined labels indicate that the user is interested in musicians, the documents 144A, 144E, 144F associated with the entity 230A (e.g., "John Doe" the musician) are processed prior to the documents 144B, 144C, 144H associated with the entity 230B (e.g., "John Doe" the lawyer). Thus, the documents 144A, 144E, 144F are processed before other documents are processed. It should be noted that the documents 144A, 144E, 144F are processed before other documents because the documents 144A, 144E, 144F include high-priority labels. As described with respect to FIGS. 3-7, prioritizing the documents 144A, 144E, 144F and additional documents based on the user-defined labels enable a high-priority documents to be searched for candidate query names (e.g., entity names that are not queried by the user) prior to a search for candidate query names in low-priority documents. As a result, if limited processing resources are available to search for candidate query names, the processing resources can be used on high-priority documents as opposed to low-priority documents.

FIG. 2 is a diagram of a system 200 that is operable to prioritize an initial set of documents based on user-defined labels and identify different entities from the prioritized documents. The system 200 includes a processing unit 202A. According to one implementation, the processing unit 202A can be included in (e.g., integrated into) the controller 102 of FIG. 1. The processing unit 202A includes the document queue 204, the query name queue 206, the disambiguation processor 602, and the entity database 208.

The processing unit 202A is configured to receive the initial set of documents 144. Additionally, the processing unit 202A is configured to receive a set of topic labels 210. In the illustrative example of FIG. 2, the set of topic labels 210 includes a topic label 210A and topic label 210B. Although only two topic labels 210 are shown in FIG. 2, in other implementations additional (or fewer) topic labels are included in the set of topic labels 210. Each topic label 210 can be encoded with metadata that is used to readily identify (or classify) documents that are related to a user interest. For example, the topic labels 210 can include topics such as music, law, tennis, cooking, etc. As used herein, the topic label 210A includes metadata that is used to identify documents that are related to musicians, and the topic label 210B includes metadata that is used to identify documents that are related to lawyers. However, it should be understood that these are merely non-limiting illustrative examples used to ease illustration of the techniques described herein.

Using the set of topic labels 210, the processing unit 202A is configured to prioritize the initial set of documents 144 based on search query of the user to identify an initial set of entities 230 related to the search query of the user. For example, the user can enter "John Doe" into as a search query. Based on the search query and the primary topic label 210A having metadata related to musicians, the processing unit 202A can sort through the initial set of documents 144 to identify the documents 144A, 144E, 144F that are related to a musician. The documents 144A, 144E, 144F at the top to the document queue 204 because the documents 144A, 144E, 144F are "highly relevant" to the set of topic labels 210. Based on the search query and the secondary topic label 210B having metadata related to lawyers, the processing unit 202A can sort through the remaining documents 144 to identify the documents 144C, 144H, 144B that are related to a lawyer. The documents 144C, 144H, 144B are below the documents 144A, 144E, 144F in the document queue 204 because the documents 144C, 144H, 144B are "less relevant" according to the topic labels 210. Based on the search query and the set of topic labels 210, the processing unit 202 can insert the remaining documents 144G, 144D at the bottom of the document queue 204 because the documents 144G, 144D have little relevant to the set of topic labels 210.

The processing unit 202A extracts query names 220 from the documents 144 in the document queue 204 and inserts the query names 220 into the query name queue 206. The processing unit 202A extracts query names from the documents 144A, 144E, 144F of higher relevance (e.g., the documents 144A, 144E, 144F at the top of the document queue 204) prior to extracting query names 220 from the documents 144G, 144D of lower relevance. For example, the processing unit 202A extracts a query name 220A from the documents 144A, 144E, 144F. To illustrate, the query name 220A can be "John Doe." After extracting the query name from the documents 144A, 144E, 144F, the processing unit 202A extracts a query name 220B from the documents 144C, 144H, 144B. To illustrate, the query name 220B can also be "John Doe." After extracting the query name from the documents 144C, 144H, 144B, the processing unit 202A extracts a query name 220C from the documents 144G, 144D and extracts a query name 220D from the document 144D. To illustrate, the query name 220C can be "John Doe," and the query name 220D can be "Mike." Multiple query names 220 can be extracted from a single document. For example, if a particular document 144 describes "John Doe" and "Sally Smith" playing in a band together, the processing unit 202A can extract "John Doe" and "Sally Smith" as query names 220.

The query names 220 are provided to the disambiguation processor 602. The disambiguation processor 602 is configured to perform disambiguation processing on each query name 220. For example, the disambiguation processor 602 performs disambiguation processing on each query name 220 to determine whether the query names 220 are ambiguous. If a particular query name 220 is not ambiguous, the disambiguation processor 602 designates the particular query name as an entity 230 and clusters the documents 144 related to the entity.

To illustrate, the disambiguation processor 602 determines that the query name 220A is not ambiguous and is associated with the famous musician "John Doe." In response to the determination, the disambiguation processor 602 designates the documents 144A, 144E, 144F associated with the query name 220A as the entity 230A and clusters the documents 144A, 144E, 144F with the entity 230A, as shown in FIG. 1. Additionally, the disambiguation processor 602 determines that the query name 220B is not ambiguous and is associated with the famous lawyer "John Doe." In response to the determination, the disambiguation processor 602 designates the documents 144C, 144H, 144B associated with the query name 220B as the entity 230B and clusters the documents 144C, 144H, 144B with the entity 230B, as shown in FIG. 1. The disambiguation processor 602 determines that the query name 220C is not ambiguous and is associated with the famous tennis player "John Doe." In response to the determination, the disambiguation processor 602 designates the query name 220C as the entity 230C and clusters the documents 144G, 144D with the entity 230C, as shown in FIG. 1. However, because the query name 220D (e.g., "Mike") is ambiguous as to a specific entity, the query name 220D is not designated as an entity 230. According to one implementation, the query name "Mike" may have a low name-plausibility score and be deprioritized for processing. For example, if processed, the query name "Mike" may result in a relatively large collection of documents that could be disambiguated into multiple categories.

According to one implementation, the disambiguation pipeline processor 602 can submit the name "John Doe" as a query. In response to submitting the name "John Doe" as a query, documents that match are retrieved and disambiguated so that the search results from the query would include the documents 144A, 144E, and 144F grouped together into the entity 230A associated with John Doe the musician. Additionally, in response to submitting the name "John Doe" as the query, the documents 144C, 144H, 144B are grouped together into the entity 230C associated with John Doe the lawyer. In addition, the documents 144G, 144D are grouped together into the entity 230C associated with John Doe the tennis player.

By prioritizing the documents 144A, 144E, 144F based on the topic labels 210, high-priority documents 144A, 144E, 144F are searched for candidate query names prior to a search for candidate query names in low-priority documents 144G, 144D. As a result, if processing resources to search for candidate query names are limited, the processing resources can be used on high-priority documents as opposed to low-priority documents.

Figure 3:
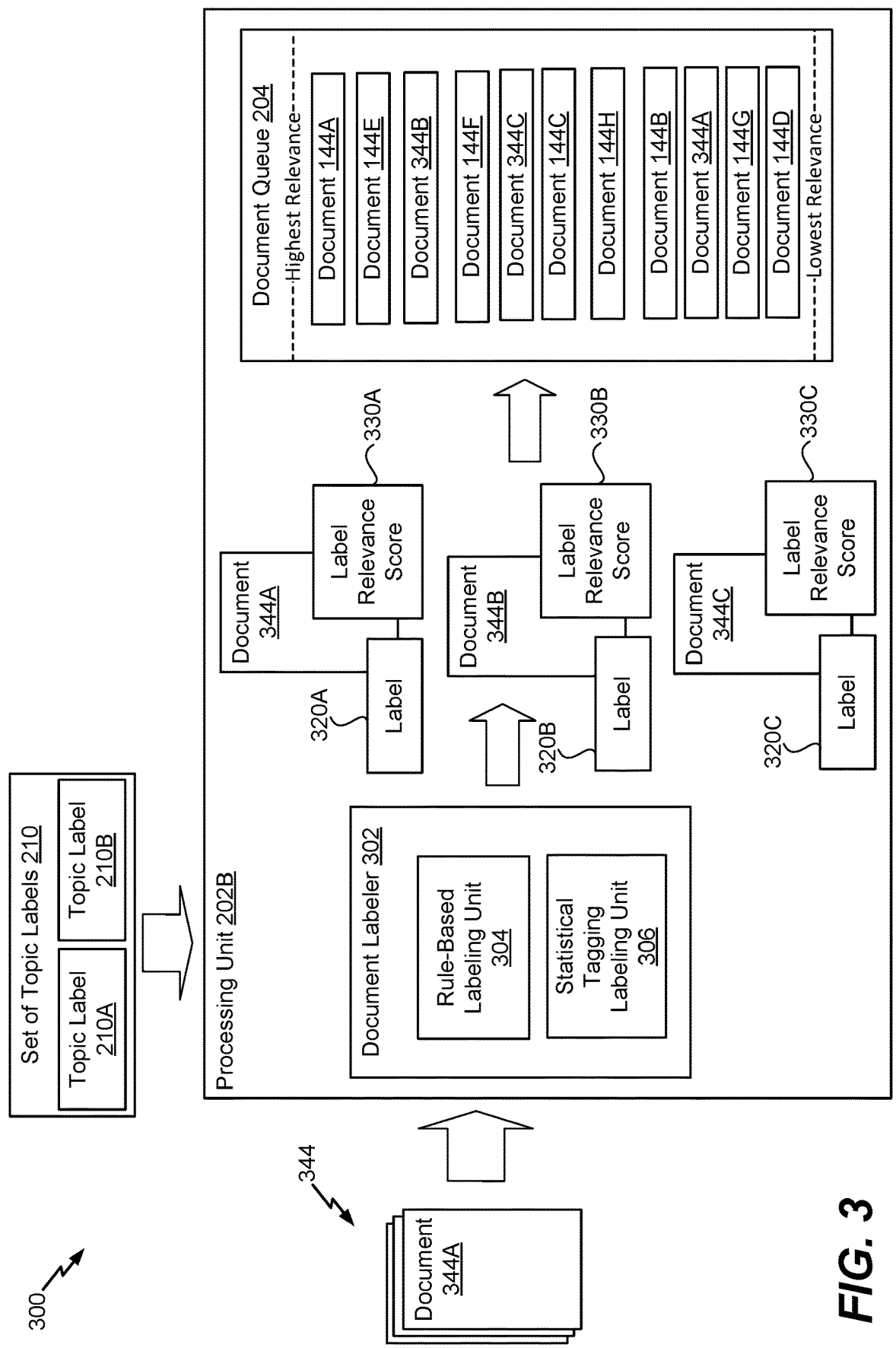
FIG. 3 is a diagram of a system that is operable to prioritize an additional set of documents based on labels and corresponding label relevance scores.

FIG. 3 is a diagram of a system 300 that is operable to prioritize an additional set of documents based on labels and corresponding label relevance scores. The system 300 includes a processing unit 202B. According to one implementation, the processing unit 202B can be included in (e.g., integrated into) the controller 102 of FIG. 1. The processing unit 202B includes a document labeler 302 and the document queue 204.

The processing unit 202B is configured to receive an additional set of documents 344. For example, the processing unit 202B receives a document 344A, a document 344B, and a document 344C. Additionally, the processing unit 202B is configured to receive the set of topic labels 210. For example, the processing unit 202B receives the topic label 210A and the topic label 210B. The document labeler 302 is configured to generate a label 320 for each document 344 of the additional set of documents 344 based on the set of topic labels 210. In some scenarios, some documents may be assigned multiple labels. In other scenarios, some documents may not be assigned a label if there are no content matches. The document labeler 302 includes a rule-based labeling unit 304 and a statistical tagging labeling unit 306. According to a rule-based labeling implementation, the rule-based labeling unit 304 can apply a list of rules to text, images, and shapes within each of the documents 344 to generate labels 320 for each of the documents 344. The list of rules applied by the rule-based labeling unit 304 can be generated based on the set of topic labels 210. For example, the rule-based labeling unit 304 can generate metadata for the topic labels 210 and can filter each document 344 using the metadata to generate the labels 320. According to a statistical tagging implementation, the statistical tagging labeling unit 306 can tag text, images, and shapes within each of the documents 344 to generate labels 320 for each of the documents 344.

The document labeler 302 is configured to generate a label 320A for the document 344A, a label 320B for the document 344B, and a label 320C for the document 344C. As a non-limiting example, the label 320A can indicate that the document 344A is associated with a tennis player, the label 320B can indicate that the document 344B is associated with a musician, and the label 320C can indicate that the document 344C is associated with a lawyer. Additionally, the processing unit 202B is configured to determine a label relevance score 330 for each label 320. For example, the processing unit 202B generates a label relevance score 330A for the label 320A, a label relevance score 330B for the label 320B, and a label relevance score 330C for the label 320C. According to some implementations, multiple label relevance scores 330 can be generated for a single document 344. For example, a label relevance score 330 can be generated for each label in a document 344 that has multiple labels. According to one implementation, an aggregated label relevance score can be generated. The aggregated label relevance score can be based on the label relevance scores 330 for the single document 344. The label relevance scores 330 are determined (e.g., calculated) based on an importance indicator associated with the corresponding label 320 to the topic labels 210 and a confidence value of the corresponding label 320. As a non-limiting example, because the label 320A is associated with a tennis player and the label 320B is associated with a musician, the label relevance score 330A may be lower than the label relevance score 330B because the label 320B is directly related to the topic label 210A and the label 320A is not related to either topic label 210A, 210B. However, if the confidence level of the label 320A is significantly higher than the confidence level of the label 320B, the label relevance score 330A for the label 320A may be higher than the label relevance score 330B for the label 320B.

The processing unit 202B is configured to prioritize each document 344 in the additional set of documents 344 based on one or more corresponding labels 320 and the corresponding label relevance scores 330. In the illustrative example of FIG. 3, the processing unit 202B determines that the document 344B has the highest priority, the document 344C has the second highest priority, and the document 344A has the lowest priority. Based on the priority, the documents 344 can be added to the document queue 204 with the documents 144. For example, from a highest relevance (e.g., a highest priority) to a lowest relevance, the document queue 204 can store the document 144A, followed by the document 144E, followed by the document 344B, followed by the document 144F, followed by the document 344C, followed by the document 144C, followed by the document 144H, followed by the document 144B, followed by the document 344A, followed by the document 144G, followed by the document 144D.

The techniques described with respect to FIG. 3 enable the additional set of documents 344 to be processed and added to the document queue 204 prior to a formalized search for candidate query names within the additional set of documents 344. By prioritizing the additional set of documents 344 based on a relevancy to the set of topic labels 210, high-priority documents, such as the document 344B, can be processed for candidate query names prior to processing low-priority documents. As a result, if processing resources to search for candidate query names are limited, the processing resources can be used on high-priority documents as opposed to low-priority documents.

Figure 4:
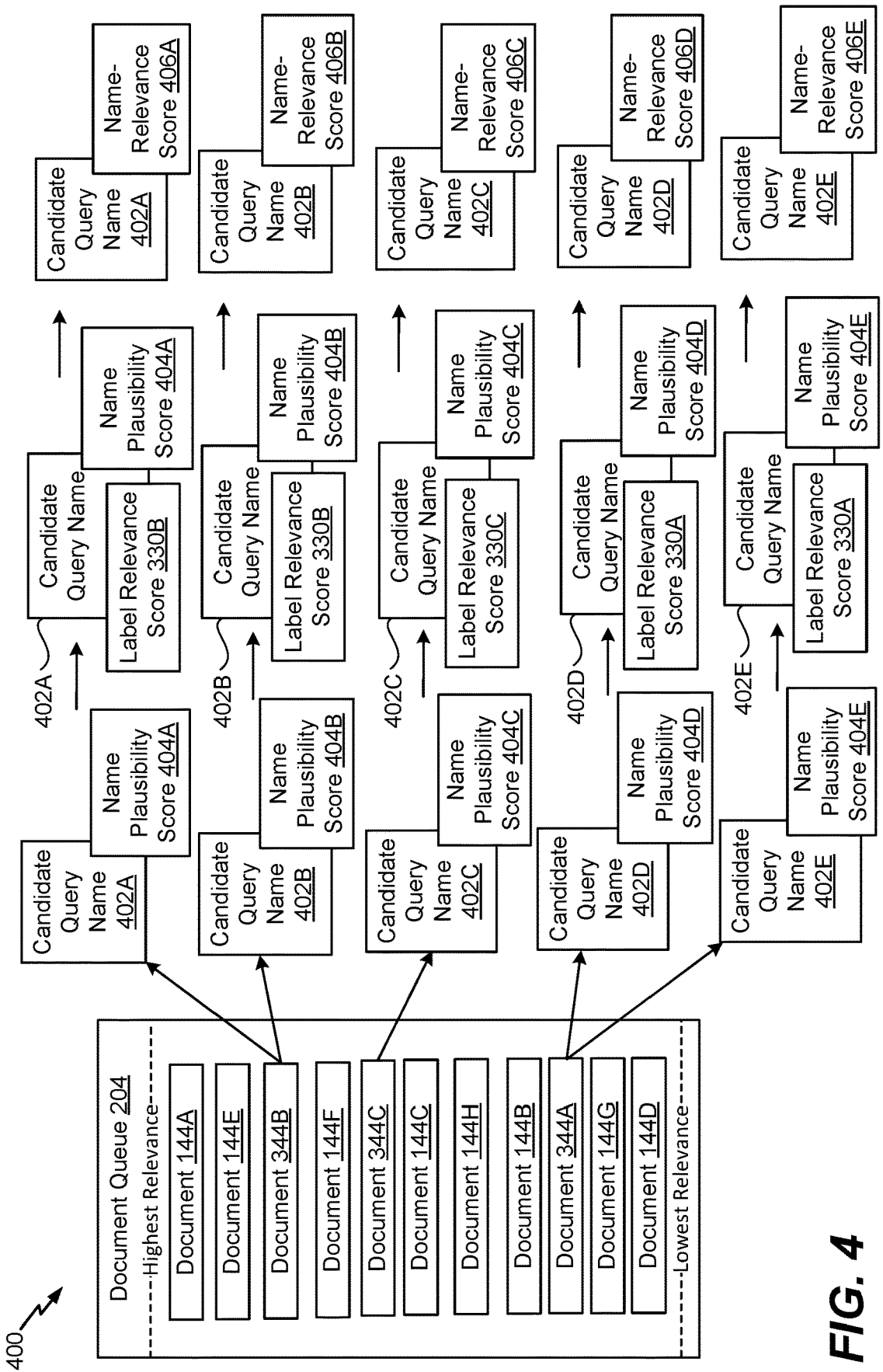
FIG. 4 is a diagram of a system that is operable to extract candidate query names from the additional set of documents.

FIG. 4 is a diagram of a system 400 that is operable to extract candidate query names from the additional set of documents. The system 400 can be included in (e.g., integrated into) the controller 102 of FIG. 1.

The system 400 is configured to extract candidate query names 402 from the additional set of documents 344 in response to prioritizing each document 344 in the additional set of documents 344. For example, the system 400 can use extraction tools, such as Statistical Information and Relation Extraction (SIRE) tools, to identify potential entity mentions (e.g., the candidate query names 402) from unstructured text within the documents 344. According to the illustrative example of FIG. 4, the system 400 extracts a candidate query name 402A from the document 344B, a candidate query name 402B from the document 344B, a candidate query name 402C from the document 344C, a candidate query name 402D from the document 344A, and a candidate query name 402E from the document 344A. As a non-limiting example, the candidate query name 402A extracted from the document 344B is "Jennifer Elam," the candidate query name 402B extracted from the document 344B is "Beverly Joiner," the candidate query name 402C extracted from the document 344C is "Brittany Banks," the candidate query name 402D extracted from the document 344A is "Toni Nelson," and the candidate query name 402E extracted from the document 344A is "Benny Minor." It should be understood that in some implementations more than one candidate query name 402 can be extracted from a document 344. For example, multiple candidate query names (e.g., "Toni Nelson, Benny Minor, Sammy Desta, etc.") can be extracted from a single document 344. However, for ease of explanation and illustration in the described example, a single candidate query name 402 is extracted from each document 344. The techniques described herein may be implemented for multiple labels, query names, and entities for each document.

The system 400 is configured to determine a name plausibility score 404 for each candidate query name 402. For example, the system 400 determines a name plausibility score 404A for the candidate query name 402A, a name plausibility score 404B for the candidate query name 402B, a name plausibility score 404C for the candidate query name 402C, a name plausibility score 404D for the candidate query name 402D, and a name plausibility score 404E for the candidate query name 402E. Each name plausibility score 404 indicates the likelihood that the corresponding candidate query name 402 corresponds to a plausible entity name. For example, in some scenarios, the extraction tools (e.g., SIRE tools) may not accurately extract candidate query names 402 because of boundary issues, unfamiliar characters, or artifacts in training data of the extraction tools. Thus, the name plausibility scores 404 indicate which candidate query names 402 are reliable and which candidate query names 402 are less reliable because of excess characters or word tokens. According to some implementations, candidate query names 402 associated with an entity of type 'person' can have higher plausibility scores 404 than candidate query names 402 associated with an organizational entity or a geographical entity.

The system 400 is configured to combine the name plausibility score 404 for each candidate query name 402 with an associated label relevance score 330 for the candidate query name 402 to generate a name-relevance score 406 for each candidate query name 402. The associated label relevance score 330 for a candidate query name 402 corresponds to the label relevance score 330 for the label 320 of the document 344 from which the candidate query name 402 was extracted. To illustrate, the system 400 combines the name plausibility score 404A with the label relevance score 330B to generate the name-relevance score 406A for the candidate query name 402A (e.g., "Jennifer Elam"). The system 400 uses the label relevance score 330B because the label relevance score 330B is used for the label 320B (or the collection of labels) of the document 344B from which the candidate query name 402A was extracted. The system 400 combines the name plausibility score 404B with the label relevance score 330B to generate the name-relevance score 406B for the candidate query name 402B (e.g., "Beverly Joiner"). The system 400 uses the label relevance score 330B because the label relevance score 330B is used for the label 320B of the document 344B from which the candidate query name 402B was extracted. The system 400 combines the name plausibility score 404C with the label relevance score 330C to generate the name-relevance score 406C for the candidate query name 402C (e.g., "Brittany Banks"). The system 400 uses the label relevance score 330C because the label relevance score 330C is used for the label 320C of the document 344C from which the candidate query name 402C was extracted. The system 400 combines the name plausibility score 404D with the label relevance score 330A to generate the name-relevance score 406D for the candidate query name 402D (e.g., "Toni Nelson"). The system 400 uses the label relevance score 330A because the label relevance score 330A is used for the label 320A of the document 344A from which the candidate query name 402D was extracted. The system 400 combines the name plausibility score 404E with the label relevance score 330A to generate the name-relevance score 406E for the candidate query name 402E ("Bennie Minor"). The system 400 uses the label relevance score 330A because the label relevance score 330A is used for the label 320A of the document 344A from which the candidate query name 402E was extracted.

The techniques described with respect to FIG. 4 enable extraction of potential entities (e.g., candidate query names 402) from the additional set of documents 344 and evaluation of the potential entities based on name plausibility scores 404 and label relevance scores 330. For example, because the extraction tools used to extract the candidate query names 402 may not be one-hundred percent reliable because of boundary issues, unfamiliar characters, or artifacts in training data of the extraction tool, the name plausibility scores 404 indicate which candidate query names 402 are reliable and which candidate query names 402 are less reliable because of excess characters or word tokens. Additionally, combining the name plausibility scores 404 with corresponding label relevance scores 330 to determine the name-relevance scores adds an extra layer of certainty to the candidate query names 402.

Figure 5:
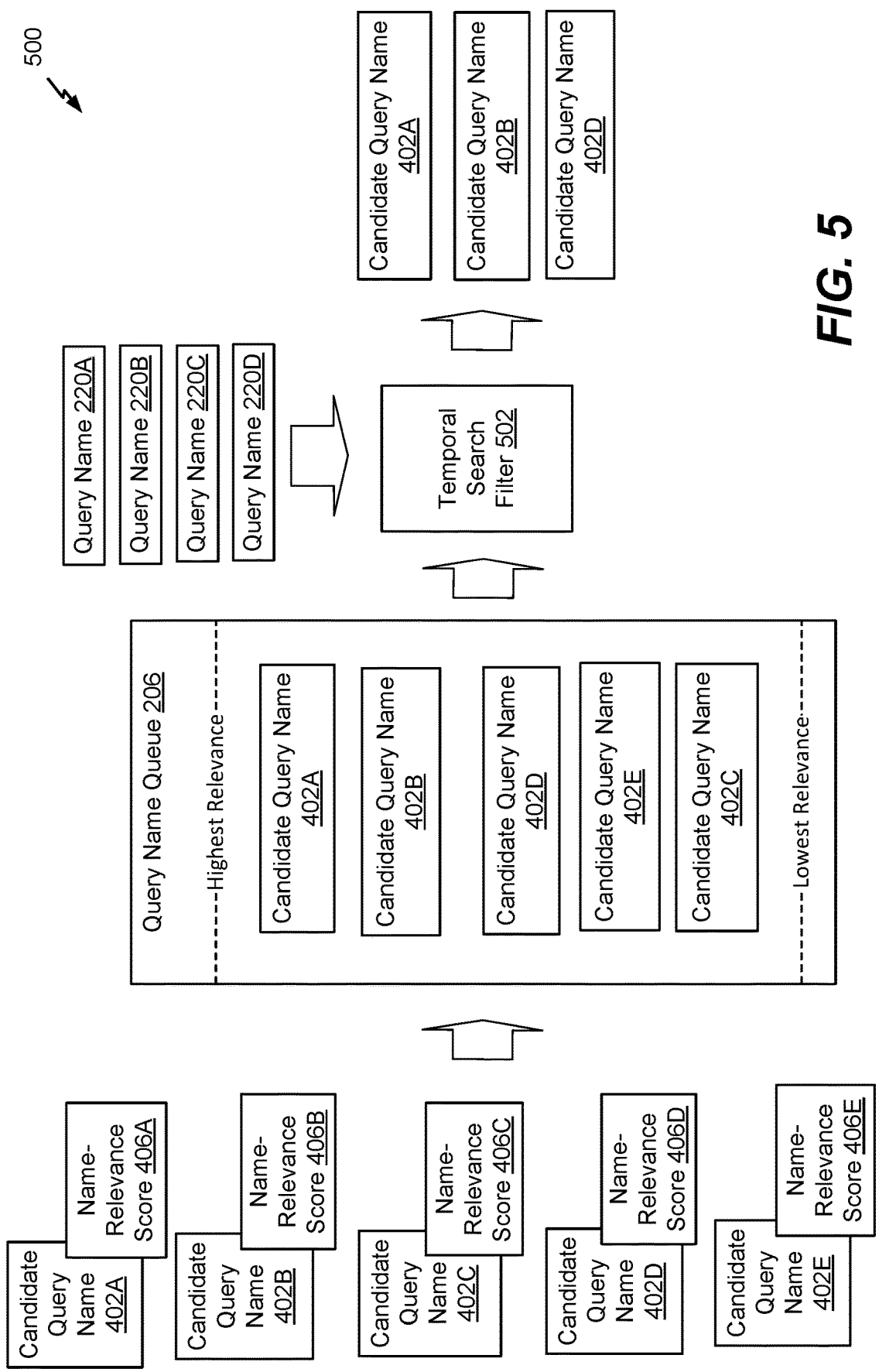
FIG. 5 is a diagram of a system that is operable to apply a temporal search filter to candidate query names.

FIG. 5 is a diagram of a system 500 that is operable to apply a temporal search filter to candidate query names. The system 500 can be included in (e.g., integrated into) the controller 102 of FIG. 1.

The system 500 is configured to prioritize the candidate query names 402 based on the name-relevance score 406 for each candidate query name 402. In the illustrative example of FIG. 5, the candidate query name 402A has the highest name-relevance score 406A, followed by the candidate query name 402B, followed by the candidate query name 402D, followed by the candidate query name 402E, followed by the candidate query name 402C. The system 500 prioritizes each candidate query name 402 in the query name queue 206 based on the name-relevance scores 406. The highest relevant candidate query name 402 (e.g., the candidate query name 402 with the highest name-relevance score 406) is placed at the top the query name queue 206 and the lowest relevant candidate query name 402 (e.g., the candidate query name 402 with the lowest name-relevance score 406) is placed at the bottom of the query name queue 206. In the illustrative example of FIG. 5, the candidate query name 402A is placed at the top of the query name queue 206, followed by the candidate query name 402B, followed by the candidate query name 402D, followed by the candidate query name 402E, followed by the candidate query name 402C.

According to the priority of the candidate query names 402, the system 500 is configured to apply a temporal search filter 502 to each candidate query name 402 to determine whether the candidate query name 402 was processed within a time frame associated with the temporal search filter 502. For example, if the temporal search filter 502 indicates a time frame of thirty days, the system 500 compares the query names 220 searched within the past thirty days to the candidate query names 402 in the query name queue 206 to determine whether particular candidate query names 402 were processed within the past thirty days. If the date of any of the documents 344 is outside the time frame indicated by the temporal search filter 502, the time frame of the temporal search filter 502 is expanded to include the date of the document 344. As a non-limiting example, if the document 344A is dated two months ago, the time frame indicated by the temporal search filter 502 is adjusted from thirty days to sixty days.

In the illustrative example of FIG. 5, the system 500 compares the query names 220 of FIG. 2 to the candidate query names 402 in the query name queue 206 to identify the candidate query names 402 that have not been processed within the time frame indicated by the search filter 502. The temporal search filter 502 is applied according to the prioritization of the candidate query names 402. For example, the temporal search filter 502 is applied to the candidate query names 402 with the highest name-relevance scores 406 (e.g., the candidate query name 402A) followed by the candidate query names 402 with the lowest name-relevance scores 406 (e.g., the candidate query name 402C). According to the illustrative example of FIG. 5, the candidate query name 402A, the candidate query name 402B, and the candidate query name 402D have not been processed within the time frame associated with the temporal search filter 502. For example, the candidate query names 402A, 402B, 402D do not match the query names 220A-220D that have been processed within the time frame associated with the temporal search filter 502. Thus, the candidate query names 402A, 402B, 402D are potential entities that have not been queried by the user.

If the system 500 determines that the candidate query names 402E, 402C have been processed within the time frame indicated by the search filter 502, the candidate query names 402E, 402C are removed from contention as potential new entities that have not been queried by the user. For example, the system 500 can determine that the user has recently searched for "Benny Minor" (e.g., the candidate query name 402E) and for "Brittany Banks" (e.g., the candidate query name 402C).

The techniques described with respect to FIG. 5 enable identification of candidate query names 402 that have not been processed. By prioritizing the candidate query names 402 based on the corresponding name-relevance scores 406, candidate query names 402 having a high-priority can be processed prior to candidate query names having a low-priority. As a result, if processing resources to process candidate query names 402 are limited, the processing resources can be used on high-priority candidate query names, such as the candidate query name 402A, as opposed to low-priority documents.

Figure 6:
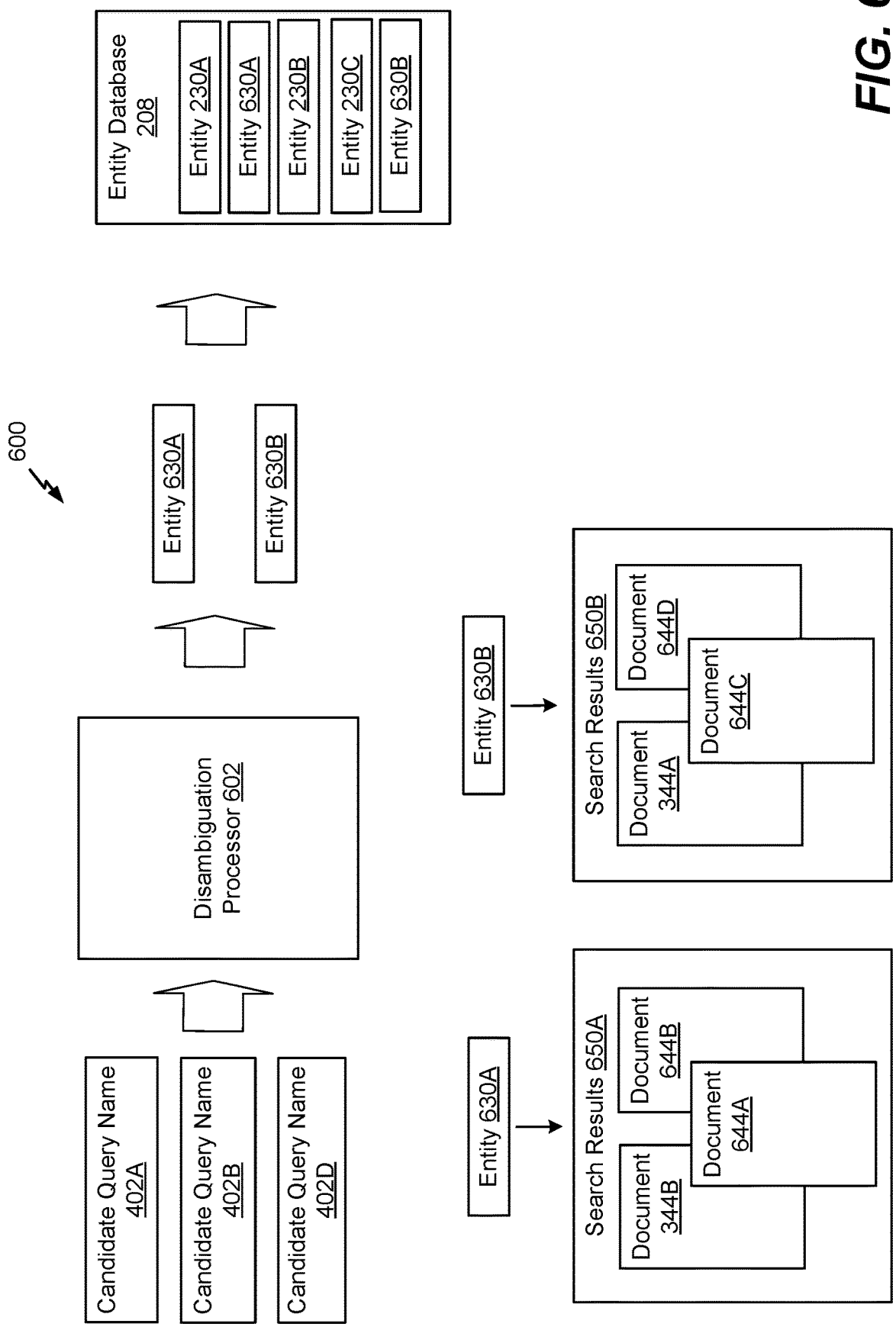
FIG. 6 is a diagram of a system that is operable to perform disambiguation processing on candidate query names to identify entities.

FIG. 6 is a diagram of a system 600 that is operable to perform disambiguation processing on candidate query names to identify entities. The system 600 includes the disambiguation processor 602. The system 600 can be included in (e.g., integrated into) the controller 102 of FIG. 1.

The disambiguation processor 602 is configured to receive a candidate query name 402 as an input and perform a search to retrieve a collection of documents based on the candidate query name 402. The documents are clustered into groups or entities, such that each entity is a subset of the collection of documents retrieved. For example, the disambiguation processor 602 is configured to perform disambiguation processing on each candidate query name 402A, 402B, 402D that has failed to be processed within the time frame of the temporal search filter 502 to identify an entity associated with the candidate query name 402. To illustrate, the disambiguation processor 602 can determine that the candidate query names 402A, 402D relate to "Jennifer Elam" the musician and "Toni Nelson" the tennis player, respectively. As a result, the disambiguation processor 602 can designate the documents 344B, 644B, 644A as an entity 630A and can designate the documents 344A, 644C, 644D as an entity 630B. The system 600 can also merge the additional entities 630A, 630B with the initial set of entities 230 in the entity database 208. The system 600 can also prioritize each entity in the entity database 208 based on the topic labels 210.

The system 600 (e.g., the controller 102) can generate a prompt (not shown) to query at least one entity of the additional entities 630. For example, the system 600 can generate, at a user interface, a prompt to query the entity 630A, a prompt to query the entity 630B, or both. The system 600 can execute the query and process search results 650 of the query to identify at least one document associated with the at least one entity of the additional entities 630. For example, the system 600 can execute the query for the entity 630A and process the search results 650A of the query to identify the document 344B, a document 644A, and a document 644B. As another example, the system 600 can execute the query for the entity 630B and process the search results 650B of the query to identify the document 344A, a document 644C, and a document 644D.

Thus, the systems 300-600 enable rapid identification of new entities 630A, 630B in the additional set of documents 344. For example, based on the user-defined topic labels 210, the systems 300-600 can determine which documents 344 are most relevant to the user. Based on the determination, the systems 300-600 can extract candidate query names 402 from the most relevant documents 344, such as the candidate query names 402A-402C, and process the candidate query names 402 from the most relevant documents 344B, 344C prior to processing other candidate query names, such as the candidate query names 402D, 402E. Thus, if processing resources are limited or if the amount of additional documents 344 is substantially large, candidate query names 402 associated with documents determined to be "of interest" to the user are processed prior to candidate query names 402 associated with documents determined to be "not of interest" to the user. Additionally, filtering the candidate query names 402 based on the query names 220 that have been recently processed can free up additional processing resources. For example, by applying the temporal search filter 502 to the candidate query names 502, the systems 300-600 can bypass performance of disambiguation processing on entities that have been previously searched by the user.

Figure 7:
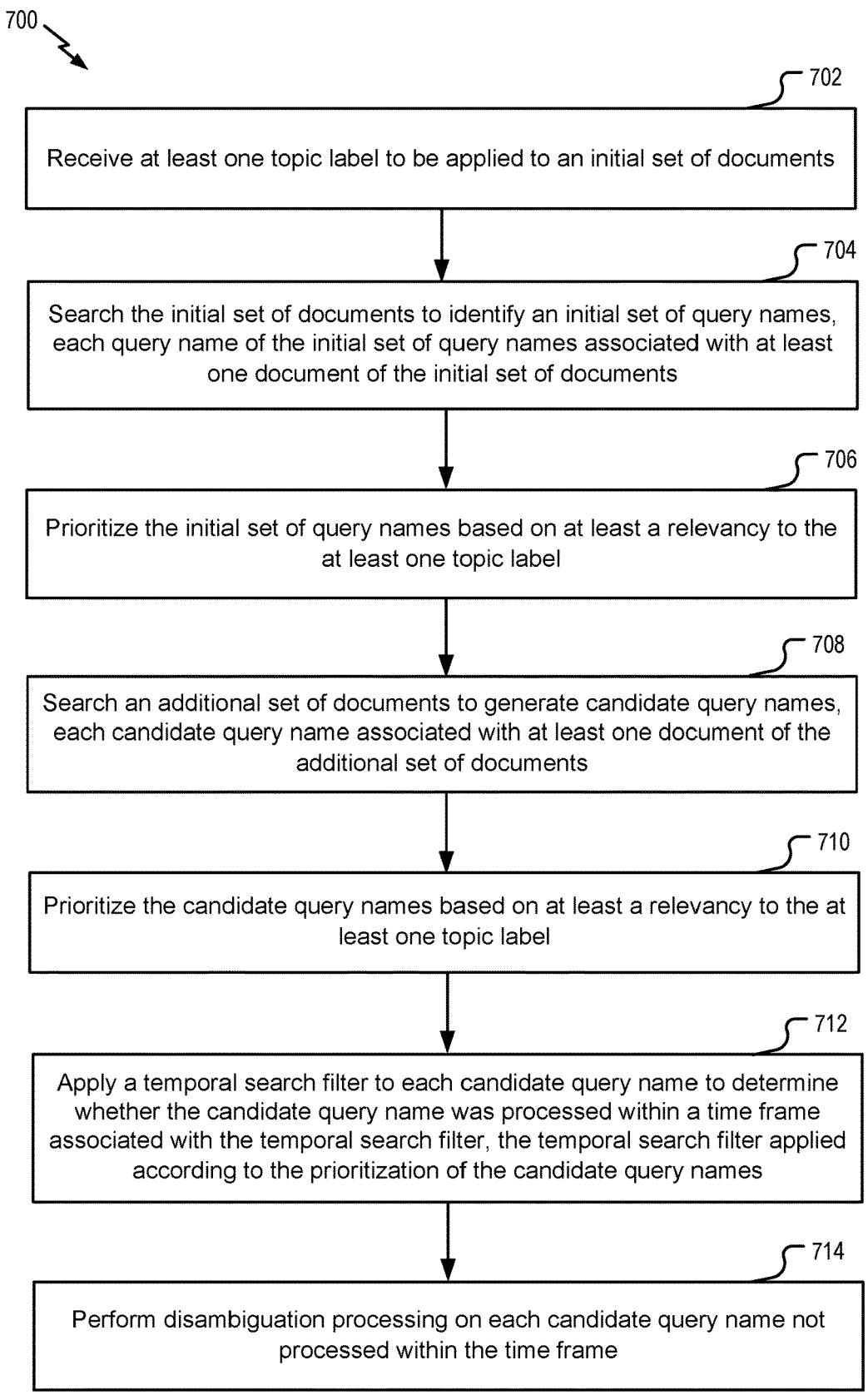
FIG. 7 is a flowchart of a method for identifying search entities.

FIG. 7 is a flowchart of a method 700 for identifying additional search entities. In an illustrative example, the method 700 is performed by the controller 102 of FIG. 1, the systems 100-600 of FIGS. 1-6, or a combination thereof.

The method 700 includes receiving at least one topic label to be applied to an initial set of documents, at 702. For example, referring to FIG. 2, the processing unit 202A can receive the topic label 210 that is applied to the initial set of documents 144. Each topic label 210 is encoded with metadata that is used to readily identify (or classify) documents that are related to a user interest. The method 700 also includes searching the initial set of documents to identify an initial set of query names, at 704. Each query name of the initial set of query names is associated with at least one document of the initial set of documents.

The method 700 also include prioritizing the initial set of query names based on at least a relevancy to the at least one topic label, at 706. For example, referring to FIG. 2, the processing unit 202A prioritizes the initial set of entities 230 based on the relevancy of each document 144 to the set of topic labels 210, the relevancy of the extracted query names 220 to the set of topic labels 210, etc.

The method 700 also includes searching an additional set of documents to generate candidate query names, at 708. Each candidate query name is associated with at least one document of the additional set of documents. For example, referring to FIG. 4, the system 400 searches the additional set of documents 344 for the candidate query names 402. Each candidate query name 402 is associated with at least one document of the additional set of documents 344. To illustrate, the candidate query names 402A, 402B are associated with the document 344B, the candidate query name 402C is associated with the document 344C, and the candidate query names 402D, 402E are associated with the document 344A.

In a particular implementation, searching the additional set of documents to generate the candidate query names includes generating a label (or labels) for each document of the additional set of documents. For example, referring to FIG. 3, the processing unit 202B generates labels 320 for each document of the additional set of documents 344. Searching the additional set of documents can also include determining a label relevance score for each label. For example, referring to FIG. 3, the processing unit 202B determines the label relevance score 330 for each label 320. Searching the additional set of documents also can include prioritizing each document in the additional set of documents based on a corresponding label and a corresponding label relevance score. For example, referring to FIG. 3, the processing unit 202B prioritizes each document 344 in the additional set of documents 344 based on the corresponding label 320 and the corresponding label relevance score 330. Searching the additional set of documents can also include extracting the candidate query names from the additional set of documents in response to prioritizing each document in the additional set of documents. For example, referring to FIG. 4, the system 400 extracts the candidate query names 402 in the additional set of documents 344.

The method 700 also include prioritizing the candidate query names based on at least a relevancy to the at least one topic label, at 710. For example, referring to FIG. 5, the system 500 prioritizes the candidate query names 402 based on the name-relevance scores 406, which as described above, are based at least in part on the set of topic labels 210. Prioritizing the candidate query names can include determining a name plausibility score for each candidate query name. For example, referring to FIG. 4, the system 400 determines the name plausibility score 404 for each candidate query name 402. Each name plausibility score 404 indicates the likelihood that the corresponding candidate query name 402 corresponds to a plausible entity name. For example, in some scenarios, the extraction tools (e.g., SIRE tools) may not accurately extract candidate query names 402 because of boundary issues, unfamiliar characters, or artifacts in training data of the extraction tools. The name plausibility scores 404 indicate which candidate query names 402 are reliable and which candidate query names 402 are less reliable because of excess characters or word tokens.

Prioritizing the candidate query names can also include combining the name plausibility score for each candidate query name with an associated label relevance score for the candidate query name to generate a name-relevance score for each candidate query name. The associated label relevance score for a candidate query name corresponds to the label relevance score for the label of the document from which the candidate query name was extracted. For example, referring to FIG. 4, the system 400 combines the name plausibility score 404 for each candidate query name 402 with an associated label relevance score 330 for the candidate query name 402 to generate the name-relevance score 406 for each candidate query name 402. The associated label relevance score 330 for the candidate query name 402 corresponds to the label relevance score 330 for the label 320 of the document 344 from which the candidate query name 402 was extracted. To illustrate, the system 400 combines the name plausibility score 404A with the label relevance score 330B to generate the name-relevance score 406A for the candidate query name 402A. The system 400 uses the label relevance score 330B because the label relevance score 330B is used for the label 320B of the document 344B from which the candidate query name 402A was extracted.

Prioritizing the candidate query names can also include prioritizing the candidate query names based on the name-relevance score for each candidate query name. For example, referring to FIG. 5, the system 500 prioritizes the candidate query names 402 based on the name-relevance score 406 for each candidate query name 402. The highest relevant candidate query name 402 (e.g., the candidate query name 402 with the highest name-relevance score 406) is placed at the top the query name queue 206 and the lowest relevant candidate query name 402 (e.g., the candidate query name 402 with the lowest name-relevance score 406) is placed at the bottom of the query name queue 206. In the illustrative example of FIG. 5, the candidate query name 402A is placed at the top of the query name queue 206, followed by the candidate query name 402B, followed by the candidate query name 402D, followed by the candidate query name 402E, followed by the candidate query name 402C.

The method 700 also includes applying a temporal search filter to each candidate query name to determine whether the candidate query name was processed within a time frame associated with the temporal search filter, at 712. The temporal search filter is applied according to the prioritization of the candidate query names. For example, referring to FIG. 5, the system 500 applies the temporal search filter 502 to each candidate query name 402 to determine whether the candidate query name 402 was processed within the time frame associated with the temporal search filter 502. To illustrate, if the temporal search filter 502 indicates a time frame of three months, the system 500 compares the query names 220 searched within the past three months to the candidate query names 402 in the query name queue 206 to determine whether particular candidate query names 402 were processed within the past three months.

The method 700 also includes performing disambiguation processing on each candidate name that has failed to be processed within the time frame, at 714. For example, referring to FIG. 6, the disambiguation processor 602 performs disambiguation processing on each candidate query name 402A, 402B, 402D that has failed to be processed within the time frame to identify additional entities. To illustrate, the disambiguation processor 602 performs disambiguation processing on each candidate query name 402A, 402B, 402D to determine whether the candidate query names 402A, 402B, 402D are ambiguous. If a particular candidate query name 402 is not ambiguous, the disambiguation processor 602 designates and groups the associated documents as an entity 630. For example, the disambiguation processor 602 can determine that the candidate query names 402A, 402D are not ambiguous and can designate and group the associated documents as entities 630A, 630B, respectively.

According to one implementation, the method 700 includes merging the additional entities with the initial set of entities in an entity database. For example, referring to FIG. 6, the system 600 can also merge the additional entities 630A, 630B with the initial set of entities 230 in the entity database 208. The method 700 can also include prioritizing each entity in the entity database based on the at least one topic label. For example, referring to FIG. 6, the system 600 can also prioritize each entity in the entity database 208 based on the topic labels 210.

According to one implementation, the method 700 includes generating a prompt to query at least one entity of the additional entities. For example, the controller 102 can generate a prompt to enable the user to search the entity 630A (e.g., "Jennifer Elam"). The method 700 can also include executing the query and processing the results of the query to identify at least one document associated with the at least one entity of the additional entities. For example, the controller 102 can execute the query to search for "Jennifer Elam" and can process the search results 650A to recover additional documents 644A, 644B.

The method 700 enables rapid identification of new entities 630A, 630B in the additional set of documents 344. For example, based on the user-defined topic labels 210, the method 700 facilitates determination of which documents 344 are most relevant to the user. Based on the determination, the candidate query names 402 from the most relevant documents 344, such as the candidate query names 402A-402C, are extracted and processed prior to extraction and processing of the other candidate query names 402, such as the candidate query names 402D, 402E. Thus, if processing resources are limited or if the amount of additional documents 344 is substantially large, candidate query names 402 associated with documents determined to be "of interest" to the user are processed prior to candidate query names 402 associated with documents determined to be "not of interest" to the user. Additionally, filtering the candidate query names 402 based on the query names 220 that have been recently processed can free up additional processing resources. For example, by applying the temporal search filter 502 to the candidate query names 402, performance of disambiguation processing on entities that have been previously searched by the user can be bypassed.

The present invention may be a system, a method, and/or a computer program product at any possible technical detail level of integration. The computer program product may include a computer readable storage medium (or media) having computer readable program instructions thereon for causing a processor (or controller) to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or eight source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other devices to cause a series of operational steps to be performed on the computer, other programmable apparatus or other devices to produce a computer implemented process, such that the instructions which execute on the computer, other programmable apparatus, or other devices implement the functions/acts specified in the flowchart and/or block diagram block or blocks.

It is to be understood that the techniques of this disclosure can be implemented using cloud computing. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The characteristics include on-demand self-service, broad network access, resource pooling, rapid elasticity, and measured service. According to on-demand self-service, a cloud consumer can unilaterally provision computing capabilities, such as server time and network storage, as needed automatically without requiring human interaction with the service's provider. According to broad network access, capabilities are available over a network and accessed through standard mechanisms that promote use by heterogeneous thin or thick client platforms (e.g., mobile phones, laptops, and PDAs). According to resource pooling, the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). According to rapid elasticity, capabilities can be rapidly and elastically provisioned, in some cases automatically, to quickly scale out and rapidly released to quickly scale in. To the consumer, the capabilities available for provisioning often appear to be unlimited and can be purchased in any quantity at any time. According to measured service, cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

The service models include Software as a Service (SaaS), Platform as a Service (PaaS), and Infrastructure as a Service (IaaS). According to SaaS, the capability provided to the consumer is to user the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings. According to PaaS, the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations. According to IaaS, the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The deployment models include a private cloud, a community cloud, a public cloud, and a hybrid cloud. According to the private cloud, the cloud infrastructure is operated solely for an organization. It may be managed by the organization or a third party and may exist on-premises or off-premises. According to the community cloud, the cloud infrastructure is shared by several organizations and supports a specific community that has shared concerns (e.g., mission, security requirements, policy, and compliance considerations). It may be managed by the organizations or a third party and may exist on-premises or off-premises. According to the public cloud, the cloud infrastructure is made available to the general public or a large industry group and is owned by an organization selling cloud services. According to the hybrid cloud, the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
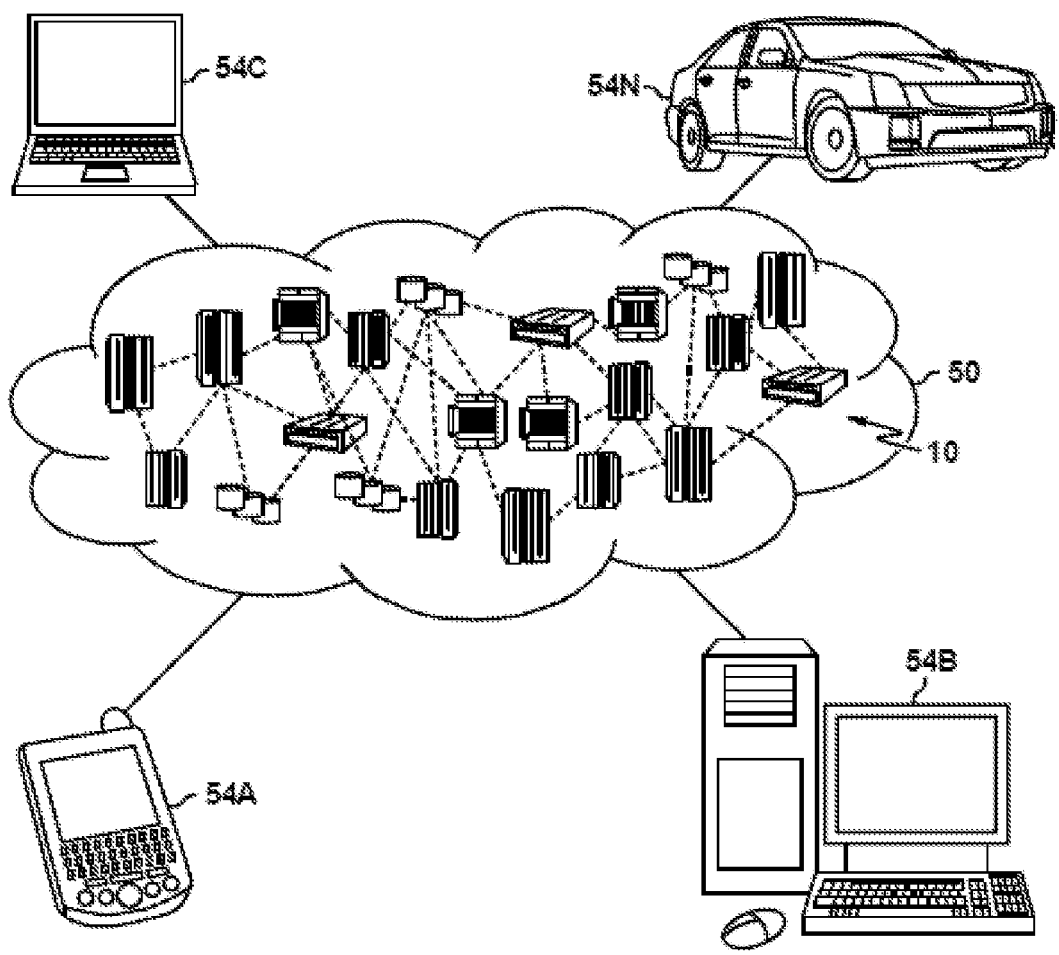
FIG. 8 is a diagram of an illustrative example of a cloud computing environment.

Referring now to FIG. 8, an illustrative cloud computing environment 50 is depicted. As shown, the cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
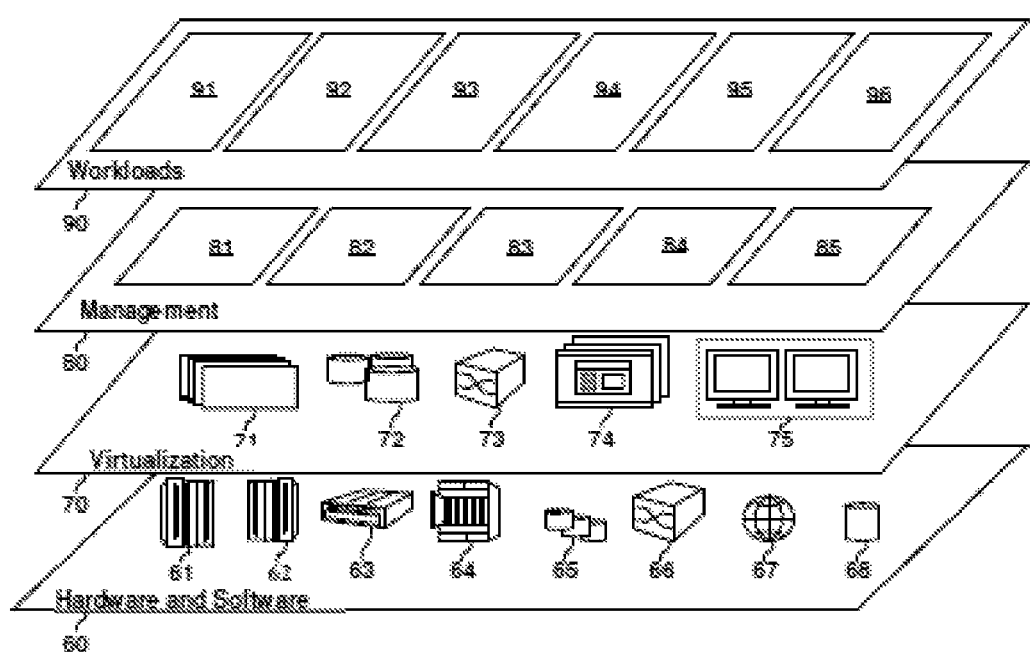
FIG. 9 is a diagram of a set of functional abstraction layers provided by the cloud computing environment.

Referring now to FIG. 9, a set of functional abstraction layers provided by cloud computing environment 50 is shown. It should be understood in advance that the components, layers, and functions shown in FIG. 9 are intended to be illustrative only and embodiments of the invention are not limited thereto.

Hardware and software layer 60 includes hardware and software components. Examples of hardware components include: mainframes 61; Reduced Instruction Set Computer (RISC) architecture based servers 62; servers 63; blade servers 64; storage devices 65; and networks and networking components 66. In some embodiments, software components include network application server software 67 and database software 68.

Virtualization layer 70 provides an abstraction layer form which the following examples of virtual entities may be provided: virtual servers 71; virtual storage 72; virtual networks 73; including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing; and candidate query name generation processing 96.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
   receiving at least one topic label to be applied to an initial set of documents;
   searching the initial set of documents to identify an initial set of query names, each query name of the initial set of query names associated with at least one document of the initial set of documents;
   prioritizing the initial set of query names based on at least a relevancy to the at least one topic label;
   searching an additional set of documents to generate candidate query names, each candidate query name associated with at least one document of the additional set of documents, wherein searching the additional set of documents to generate the candidate query names comprises:
      generating a label for each document of the additional set of documents,
      determining a label relevance score for each label,
      prioritizing each document in the additional set of documents based on a corresponding label and a corresponding label relevance score, and
      after prioritizing each document in the additional set of documents, extracting the candidate query names from the additional set of documents;
   prioritizing the candidate query names based on at least a relevancy to the at least one topic label;
   applying a temporal search filter to each candidate query name to determine whether the candidate query name was processed within a time frame associated with the temporal search filter, the temporal search filter applied according to the prioritization of the candidate query names; and
   performing disambiguation processing on each candidate query name not processed within the time frame, to determine whether the candidate query names are ambiguous.

2. The method of claim 1, wherein the label for each document is generated using rule-based labeling or statistical tagging.

3. The method of claim 1, wherein the label relevance score for each label is determined based on a confidence value of the corresponding label and an importance indicator associated with the corresponding label.

4. The method of claim 1, wherein prioritizing the candidate query names comprises:
   determining a name plausibility score for each candidate query name;
   combining the name plausibility score for each candidate query name with an associated label relevance score for the candidate query name to generate a name-relevance score for each candidate query name, the associated label relevance score for a candidate query name corresponding to the label relevance score for the label of the document from which the candidate query name is extracted; and
   prioritizing the candidate query names based on the name-relevance score for each candidate query name.

5. The method of claim 1, wherein the at least one topic label includes metadata that is used to identify documents that are related to a user interest.

6. The method of claim 1, wherein performing the disambiguation processing comprises designating documents associated with a particular candidate query name, of the candidate query names, as an entity.

7. The method of claim 6, further comprising prioritizing each entity based on the at least one topic label.

8. An apparatus comprising:
   a memory; and
   a controller coupled to the memory, the controller configured to:
      receive at least one topic label to be applied to an initial set of documents;
      search the initial set of documents to identify an initial set of query names, each query name of the initial set of query names associated with at least one document of the initial set of documents;
      prioritize the initial set of query names based on at least a relevancy to the at least one topic label;
      search an additional set of documents to generate candidate query names, each candidate query name associated with at least one document of the additional set of documents;
      generate a label for each document of the additional set of documents;
      determine a label relevance score for each label;
      prioritize each document in the additional set of documents based on a corresponding label and a corresponding label relevance score;
      after prioritizing each document in the additional set of documents, extract the candidate query names from the additional set of documents;
      prioritize the candidate query names based on at least a relevancy to the at least one topic label;
      apply a temporal search filter to each candidate query name to determine whether the candidate query name was processed within a time frame associated with the temporal search filter, the temporal search filter applied according to the prioritization of the candidate query names; and
      perform disambiguation processing on each candidate query name not processed within the time frame, to determine whether the candidate query names are ambiguous.

9. The apparatus of claim 8, wherein the label for each document is generated using rule-based labeling or statistical tagging.

10. The apparatus of claim 8, wherein the label relevance score for each label is determined based on a confidence value of the corresponding label and an importance indicator associated with the corresponding label.

11. The apparatus of claim 8, wherein the controller is configured to:
   determine a name plausibility score for each candidate query name;
   combine the name plausibility score for each candidate query name with an associated label relevance score for the candidate query name to generate a name-relevance score for each candidate query name, the associated label relevance score for a candidate query name corresponding to the label relevance score for the label of the document from which the candidate query name is extracted; and
   prioritize the candidate query names based on the name-relevance score for each candidate query name.

12. The apparatus of claim 8, wherein the at least one topic label includes metadata that is used to identify documents that are related to a user interest.

13. The apparatus of claim 8, wherein the controller is configured to designate documents associated with a particular candidate query name, of the candidate query names, as an entity.

14. A computer program product for identifying search entities, the computer program product comprising a computer readable storage medium having program instructions embodied therewith, the program instructions executable by a controller to cause the controller to:
   receive, by the controller, at least one topic label an initial set of documents;
   search, by the controller, the initial set of documents to identify an initial set of query names, each query name of the initial set of query names associated with at least one document of the initial set of documents;
   prioritize, by the controller, the initial set of query names based on at least a relevancy to the at least one topic label;
   search, by the controller, an additional set of documents to generate candidate query names, each candidate query name associated with at least one document of the additional set of documents;
   generate, by the controller, a label for each document of the additional set of documents;
   determine, by the controller, a label relevance score for each label;
   prioritize, by the controller, each document in the additional set of documents based on a corresponding label and a corresponding label relevance score; and
   extract, by the controller, the candidate query names from the additional set of documents after prioritizing each document in the additional set of documents;
   prioritize, by the controller, the candidate query names based on at least a relevancy to the at least one topic label;
   apply, by the controller, a temporal search filter to each candidate query name to determine whether the candidate query name was processed within a time frame associated with the temporal search filter, the temporal search filter applied according to the prioritization of the candidate query names; and
   perform, by the controller, disambiguation processing on each candidate query name not processed within the time frame, to determine whether the candidate query names are ambiguous.

15. The computer program product of claim 14, wherein the program instructions are executable by the controller to cause the controller to:
   determine, by the controller, a name plausibility score for each candidate query name;
   combine, by the controller, the name plausibility score for each candidate query name with an associated label relevance score for the candidate query name to generate a name-relevance score for each candidate query name, the associated label relevance score for a candidate query name corresponding to the label relevance score for the label of the document from which the candidate query name is extracted; and
   prioritize, by the controller, the candidate query names based on the name-relevance score for each candidate query name.

16. The computer program product of claim 14, wherein the at least one topic label includes metadata that is used to identify documents that are related to a user interest.

* * * * *